United States Patent Office 3,506,662
Patented Apr. 14, 1970

3,506,662
PROCESS FOR PREPARATION OF PYRAZINOYL- AND PYRAZINAMIDOGUANIDINES
Edward J. Cragoe, Jr., and John B. Bicking, Lansdale, Pa., assignors to Merck & Co., Inc., Rahway, N.J., a corporation of New Jersey
No Drawing. Filed Apr. 30, 1968, Ser. No. 725,508
Int. Cl. C07d 51/76
U.S. Cl. 260—250                    10 Claims

ABSTRACT OF THE DISCLOSURE

A process is described for the preparation of pyrazinoylguanidines and pyrazinamidoguanidines which comprises the reaction of a guanidine or an aminoguanidine with a 3,5-diamino-6-chloropyrazinethiolcarboxylate ester. The products have utility as diuretic agents.

---

This invention relates to a novel process for the preparation of pyrazinoylguanidines and pyrazinamidoguanidines from novel pyrazinethiolcarboxylate esters. In particular it relates to the process which comprises the reaction of novel 3,5-diamino-6-chloropyrazinethiolcarboxylate esters with a guanidine or aminoguanidine to produce 3,5-diamino-6-chloropyrazinoylguanidines and 3,5-diamino-6-chloropyrazinamidoguanidines. The process can be represented by the following equation:

METHOD A

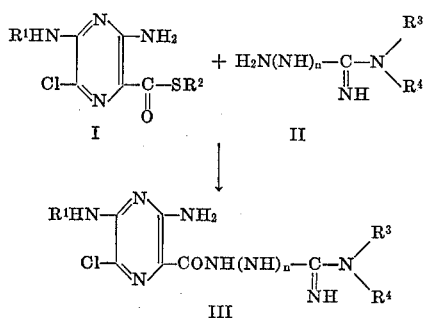

wherein $R^1$ represents (a) hydrogen,
(b) lower alkyl of from 1 to about 5 carbons, either straight or branched chain, e.g., methyl, ethyl, propyl, isopropyl, butyl, isobutyl, pentyl and the like,
(c) lower alkenyl of from 3 to about 5 carbon atoms, e.g., allyl, 2-butenyl, and the like,
(d) lower(cycloalkyl-alkyl), wherein the lower cycloalkyl moiety has from 3 to about 6 carbon atoms such as cyclopropyl, cyclopentyl, and cyclohexyl, and the lower alkyl moiety has from 1 to about 3 carbons, such as methyl, ethyl, and propyl;

$R^2$ represents
(a) lower alkyl of from 1 to about 5 carbon atoms such as methyl, ethyl, propyl, butyl, and pentyl,
(b) mononuclear aryl, especially phenyl,
(c) mononuclear aryl-lower alkyl, especially phenyl-lower alkyl, wherein the lower alkyl group has from 1 to about 3 carbon atoms such as methyl, ethyl and propyl;

$R^3$ represents
(a) hydrogen,
(b) lower alkyl of from 1 to about 5 carbon atoms, such as methyl, ethyl, propyl, butyl, and pentyl, either straight or branched chain and either unsubstituted or substituted with such as (1)hydroxy, (2) mononuclear aryl, especially phenyl;

$R^4$ represents
(a) hydrogen,
(b) lower alkyl of from 1 to about 5 carbon atoms, either straight or branched chain, such as methyl, ethyl, propyl, butyl, and pentyl;

$n$ is zero or one.

The products prepared by the process of this invention possess useful diuretic properties but more importantly they selectively enhance the excretion of sodium and chloride ions while suppressing the excretion of potassium. They are especially useful in the treatment or management of edema and other abnormalities resulting from the retention of excess quantities of sodium and/or fluid by the animal organism.

Prior to the invention of the present process the usual method of preparing these pyrazinoylguanidines and pyrazinamidoguanidines comprised treating a normal ester, i.e., oxy-ester, of pyrazinoic acid with a guanidine or an aminoguanidine. However, it was found that the esters often reacted very slowly and required drastic reaction conditions which increased the tendency toward side reactions such as cyclization of the product and other yield reducing effects. Hence, a more reactive derivative of the pyrazinoic acids was required. It was found that the thiolesters of the present invention are more reactive than the corresponding oxy-esters toward guanidine and aminoguanidine thus permitting reaction at lower temperature for shorter times and correspondingly cleaner reaction mixtures and better yields.

The pyrazinethiolcarboxylate esters which form another embodiment of this invention, being useful novel compounds are prepared most readily by either of two routes, designated herein as Method B and Method C.

METHOD B

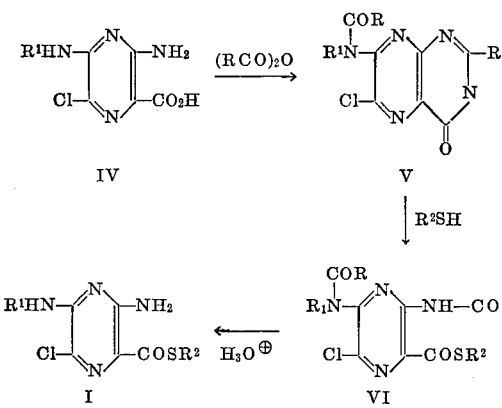

wherein $R^1$ and $R^2$ have the meanings assigned above and R represents lower alkyl of from 1 to about 4 carbon atoms such as methyl, ethyl, propyl, or butyl, either straight or branched chain, and either unsubstituted or substituted with phenyl. The actual nature of R is not critical to the reaction as it does not appear in the resulting thiolester, but rather it can arise from the use of any readily available organic acid anhydride. It has been found that butyric anhydride is very suitable and has been used exclusively in the examples that follow, but as stated any common organic acid anhydride serves equally well.

The first step in the synthesis of the thiolesters, the preparation of the 2-R-6-chloro - 7 - acylamido-4H-pyrazino[2,3-d][1,3]oxazin-4-ones, V, comprises heating the pyrazinoic acid (IV) in the acid anhydride of formula $(RCO)_2O$ at reflux temperature or up to about 150° C., if the particular anhydride refluxes at a higher temperature, for from 1 to about 3 hours. Upon cooling, Compound V crystallizes and is collected. Reaction of V with a meracptan of formula $R^2SH$ in the presence of a small amount of a base such as triethylamine, pyridine or the like, in an inert solvent such as ethyl acetate provides the $R^2$ 3,5-bis(acylamido) - 6 - chloropyrazinethiolcarboxylate, VI, which on acid hydrolysis of the acyl groups yield the $R^2$ 3,5-diamino - 6 - chloropyrazinethiolcarboxylates, I.

METHOD C

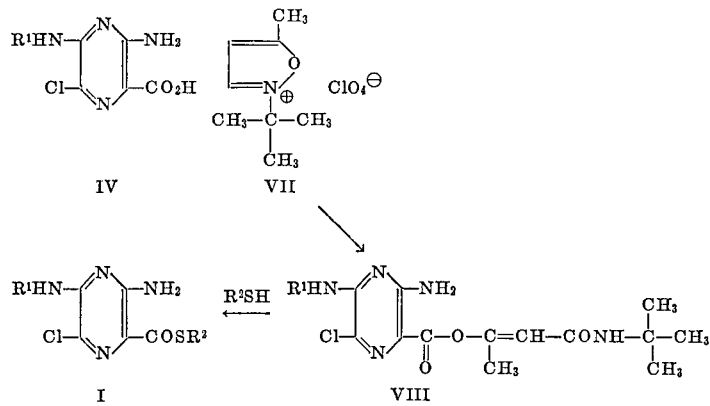

By this method the pyrazinethiolcarboxylates (I), are prepared by treating the pyrazinoic acid (IV) in a polar non-protic solvent such as dimethylformamide dimethyl sulfoxide dimethyl sulfone, acetonitrile, and tetrahydrofuran in the presence of a base such as a trialkylamine or pyridine with N-(t-butyl)-5-methylisoxazolium perchlorate (VII). Dilution of the reaction mixture with water precipitates the N-(t-butyl)-3-(3,5-diamino-6-chloropyrazinecarbonyloxy)crotonamide (VIII). Treatment of VIII with a mercaptan, $R^2SH$ in the presence of a base affords the pyrazinethiol esters (I).

The preparation of these novel thiol-esters by both methods is described in the examples which follow from which the reaction conditions are apparent.

Having thus obtained the pyrazinethiol esters, the process of this invention, Method A, is conducted by preparation of a guanidine or aminoguanidine from the corresponding mineral acid addition salt and treating the free base with the pyrazinethiolcarboxylate. The guanidine and aminoguanidine free base is normally obtained by treating a mineral acid addition salt with a solution of sodium in a lower alkanol such as methanol, ethanol, propanol, isopropanol, or butanol and preferably by heating the mixture at reflux for 1 to 2 hours. Elevated temperatures are not required but lower temperatures unnecessarily prolong reaction times. On evaporation of the alkanol solvent there is left a syrupy residue which is treated directly with solid pyrazinethiocarboxylate (I) by warming for a few minutes at steam bath temperature or alternatively the guanidine or aminoguanidine can be treated with a lower alkanol solution of the pyrazinethiolcarboxylate. In either case gentle heating promotes the reaction but is not required. The product is isolated by evaporation of any solvent present, washing the residue with water and collecting the solids on a filter.

The following examples described the preparations of the various 3,5 - diamino-6-chloropyrazinethiolcarboxylates and the process of this invention by the preparation of several pyrazinoylguanidines and pyrazinamidoguanidines. It is to be understood that the invention is not limited to the specific compounds described in the examples or by the specific reaction conditions described therein but is to be understood to embrace variations and modifications thereof which fall within the scope of the appended claims.

EXAMPLE 1

Butyl 3,5-diamino-6-chloropyrazinethiolcarboxylate

STEP A: PREPARATION OF 2 - PROPYL - 6 - CHLORO-7-BUTYRAMIDO - 4H - PYRAZINO[2,3 - d][1,3]OXAZIN-4-ONE

A mixture of 3,5 - diamino-6-chloropyrazinoic acid (56.58 g., 0.30 mole) and butyric anhydride (500 ml.) is heated over a period of 30 minutes to 150° C. and the resulting solution is maintained at 150° C. for 1 hour longer.

The reaction solution is chilled in an ice bath and the resulting solid is collected by filtration and washed with ether. There is obtained 49.4 g. (53%) of product, M.P. 163–167° C. Recrystallization from butyric anhydride gives 40.1 g. (43%) of 2-propyl-6-chloro-7-butyramido-4H-pyrazino[2,3-d][1,3]oxazin-4-one, M.P. 170–172°C.

Analysis.—Calc. for $C_{13}H_{15}ClN_4O_3$ (percent): C, 50.25; H, 4.87; N, 18.03. Found (percent): C, 50.13; H, 4.78; N, 18.21.

STEP B: PREPARATION OF BUTYL 3,5 - BIS(BUTYRAMIDO)-6-CHLOROPYRAZINETHIOLCARBOXYLATE

A mixture of 2-propyl-6-chloro-7-butyramido-4H-pyrazino[2,3-d][1,3]oxazin-4-one (3.1 g., 0.01 mole), butyl mercaptan (2.7 g., 0.03 mole), triethylamine (100 mg.) and ethyl acetate (25 ml.) is stirred at room temperature for 6 hours until a clear solution is obtained. The solution is allowed to stand 16 hours while the crystalline product separates. The product is collected and recrystallized from benzene to yield 2.2 g. (55%) of butyl 3,5-bis(butyramido) - 6 - chloropyrazinethiolcarboxylate, M.P. 123.5–125.5° C.

Analysis.—Calc. for $C_{17}H_{25}ClN_4O_3S$ (percent): C, 50.92; H, 6.29; N, 13.97. Found (percent): C, 51.35; H, 6.05; N, 13.95.

Step C: Preparation of butyl 3,5-diamino-6-chloropyrazinethiolcarboxylate

A mixture of butyl 3,5-bis(butyramido)-6-chloropyrazinethiolcarboxylate (3.0 g, 0.0075 mole) 5% hydrochloric acid (20 ml.) and isopropyl alcohol (20 ml.) is heated 20 minutes on a steam bath until solution is complete. The solution is cooled, diluted with 20 ml. of water, and neutralized by the addition of saturated sodium bicarbonate solution. The product which precipates is collected, and recrystallized from benzene to yield 1.0 g. (51%) of butyl 3,5-diamino-6-chloropyrazinethiolcarboxylate, M.P. 129.5–130.5° C.

Analysis.—Calc. for $C_9H_{13}ClN_4OS$ (percent): C, 41.45; H, 5.02; N, 21.49. Found (percent): C, 41.12; H, 4.83; N, 21.37.

EXAMPLE 2

Phenyl 3,5-diamino-6-chloropyrazinethiolcarboxylate

STEP A: PREPARATION OF PHENYL 3,5-BIS(BUTYR-AMIDO)-6-CHLOROPYRAZINETHIOLCARBOXYLATE

To a suspension of 2-propyl-6-chloro-7-butyramido-4H-pyrazino[2,3-d][1,3]oxazin-4-one (from Example 1) (3.11 g., 0.01 mole) in ethyl acetate (25 ml.), containing triethylamine (200 mg.), is added thiophenol (3.31 g., 0.03 mole) and the resulting solution is stirred at room temperature for 1 hour.

The reaction solution is concentrated to dryness under reduced pressure and the residue is recrystallized from cyclohexane. There is obtained 3.50 g. (83%) of product, M.P. 137.5–142° C. A second recrystallization from cyclohexane gives 3.10 g. (74%) of 3,5-bis(butyramido)-6-chloropyrazinethiolcarboxylate, M.P. 142–144° C.

Analysis.—Calc. for $C_{19}H_{21}ClN_4O_3S$ (percent): C, 54.22; H, 5.03; N, 13.31. Found (percent): C, 54.26; H, 5.08; N, 13.39.

STEP B: PREPARATION OF PHENYL 3,5-DIAMINO-6-CHLOROPYRAZINETHIOLCARBOXYLATE

A mixture of phenyl 3,5-bis(butyramido)-6-chloropyrazinethiolcarboxylate (1.05 g., 0.0025 mole), 5% aqueous hydrochloric acid (7 ml.) and isopropyl alcohol (7 ml.) is heated on a steam bath with stirring for 10 minutes.

The reaction mixture is cooled and the resulting solid is collected by filtration, washed with water and dried. The yield is 0.67 g. (96%), M.P. 228–231° C. Recrystallization from acetonitrile gives 0.50 g. (72%) of phenyl 3,5 - diamino - 6 - chloropyrazinethiolcarboxylate, M.P. 236–237° C.

Other esters of 3,5-diamino-6-chloropyrazinethiolcarboxylate prepared by the process of Examples 1 and 2 are described in Table I. The products are prepared following substantially the same procedure described in Examples 1 and 2, except that the butylmercaptan of Example 1 and the phenylmercaptan of Example 2 is replaced by the appropriate mercaptan, $R^2SH$, defined in Table I.

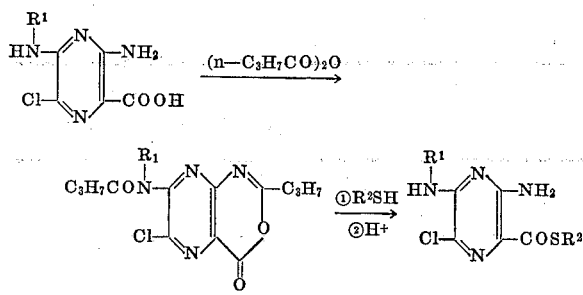

EXAMPLE 13

Benzyl 3,5-diamino-6-chloropyrazinethiolcarboxylate

STEP A: PREPARATION OF N - (t - BUTYL) - 3 - (3,5-DIAMINO-6-CHLOROPYRAZINECARBONYLOXY)CROTONAMIDE

A mixture of 3,5-diamino-6-chloropyrazinoic acid (1.90 g., 0.01 mole) and triethylamine (1.0 g., 0.01 mole) in dimethylformamide (20 ml.) is stirred for 10 minutes. N-(t-butyl)-5-methylisoxazolium perchlorate (2.40 g., 0.01 mole) is added and the resulting solution stirred for 2 hours. Water (100 ml.) is added and the solid which separates is collected and dried. The yield is 2.85 g. (87%), M.P. 171–176° C. Recrystallization from acetonitrile gives light yellow crystals of N-(t-butyl)-3-(3,5-diamino - 6 - chloropyrazinecarbonyloxy)crotonamide, M.P. 187–189° C.

Analysis.—Calc. for $C_{13}H_{18}ClN_5O_3$ (percent): C, 47.63; H, 5.53; N, 21.37. Found (percent): C, 47.87; H, 5.55; N, 21.42.

STEP B: PREPARATION OF BENZYL 3,5-DIAMINO-6-CHLOROPYRAZINETHIOLCARBOXYLATE

Sodium hydroxide (0.08 g., 0.002 mole) is dissolved in water (0.5 ml.) followed by the addition of acetonitrile (3.5 ml.). Benzyl mercaptan (0.15 ml.) is added, stirred one minute and N-(t-butyl) - 3 - (3,5-diamino-6-chloropyrazinecarbonyloxy)crotonamide (0.328 g., 0.001 mole) is introduced. This reaction mixture is stirred for two hours and diluted with water (6 ml.). The yellow solid that separates is collected and dried, 0.25 g. (85%), M.P. 137–142° C. Recrystallization from acetonitrile gives benzyl 3,5 - diamino - 6 - chloropyrazinethiolcarboxylate, M.P. 145–146.5° C.

Analysis.—Calc. for $C_{12}H_{11}ClN_4OS$ (percent): C, 48.89; H, 3.76; N, 19.01. Found (percent): C, 48.98; H, 3.54; N, 18.85.

Other esters of 3,5-diamino-6-chloropyrazinethiolcarboxylate prepared by the process of Example 13 are described in Table II. They are prepared following substantially the same procedure described in Example 13, except that the benzyl mercaptan is replaced by the appropriate mercaptan, $R^2SH$, defined in Table II, and the 3,5-diamino-6-chloropyrazinoic acid of Example 13 is replaced by the appropriate 3-amino-5-$NHR^1$-6-chloropyrazinoic acid.

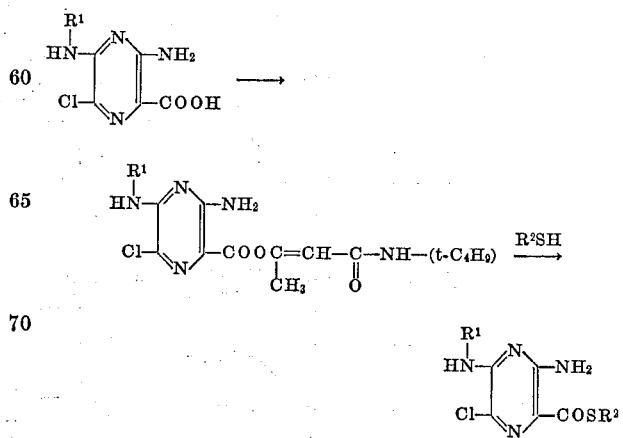

TABLE I

| Example | $R^1$ | $R^2$ |
|---|---|---|
| 3 | H | $CH_3$— |
| 4 | H | $C_2H_5$— |
| 5 | H | n-$C_3H_7$— |
| 6 | H | C6H5-$CH_2$— |
| 7 | H | C6H5-$(CH_2)_2$— |
| 8 | i-$C_3H_7$— | $CH_3$— |
| 9 | $CH_2$=CH—$CH_2$— | $C_2H_5$— |
| 10 | n-$C_4H_9$— | n-$C_3H_7$— |
| 11 | cyclopropyl-$CH_2$— | n-$C_4H_9$— |
| 12 | n-$C_4H_9$— | C6H5— |

TABLE II

| Example | R¹ | R² |
|---|---|---|
| 14 | H | $CH_3-$ |
| 15 | H | $C_2H_5-$ |
| 16 | H | $n-C_3H_7-$ |
| 17 | H | $n-C_4H_9-$ |
| 18 | H | C₆H₅—CH₂CH₂— |
| 19 | H | C₆H₅— |
| 20 | $i-C_3H_7-$ | $CH_3-$ |
| 21 | $CH_2=CH-CH_2-$ | $C_2H_5-$ |
| 22 | $n-C_4H_9-$ | $n-C_3H_7-$ |
| 23 | cyclopropyl-$CH_2-$ | $n-C_4H_9-$ |
| 24 | $n-C_4H_9-$ | C₆H₅— |

EXAMPLE 25

3,5-diamino-6-chloropyrazinoylguanidine

To a solution of sodium (0.58 g., 0.025 mole) in isopropyl alcohol (20 ml.) is added guanidine hydrochloride (2.63 g., 0.0275 mole) and the resulting suspension is heated under reflux for 30 minutes with stirring. The reaction mixture is concentrated to a paste under reduced pressure and the residue is treated with butyl 3,5-diamino-6-chloro-pyrazinethiolcarboxylate (1.30 g., 0.005 mole). The mixture is heated on a steam bath for 5 minutes. After cooling to room temperature, the reaction mixture is stirred with water (10 ml.), filtered and the collected solid is washed with water. Purification is accomplished by dissolving the product in aqueous mehanesulfonic acid, filtering and reprecipitating with aqueous sodium solution. There is obtained 0.90 g. (77%) of 3,5-diamino-6-chloropyrazinoylguanidine, M.P. 240.5–241.5° C. (dec.).

*Analysis.*—Calc. for $C_6H_8ClN_7O$ (percent): C, 31.38; H, 3.51; N, 42.70. Found (percent): C, 31.15; H, 3.54; N, 42.54.

3,5-diamino-6-chloropyrazinoylguanidine is similarly prepared employing the procedure of Example 25, but substituting for the butyl 3,5-diamino-6-chloropyrazine-thiolcarboxylate utilized therein an equivalent amount of any one of the corresponding methyl, ethyl, propyl, phenethyl, phenyl, or benzyl esters, described in Examples 2 to 7, and 14 to 19.

Also employing the procedure of Example 25, but substituting for the butyl 3,5-diamino-6-chloropyrazinethiolcarboxylate and the guanidine hydrochloride used therein, equivalent amounts of the esters of 3-amino-5-NHR¹-6-chloropyrazinethiolcarboxylate and a guanidine of formula

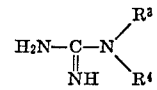

described in Table III there are produced the 1-(3-amino-5 - NHR¹-6-chloropyrazinoyl)-3-R³-3-R⁴-guanidines also depicted in Table III.

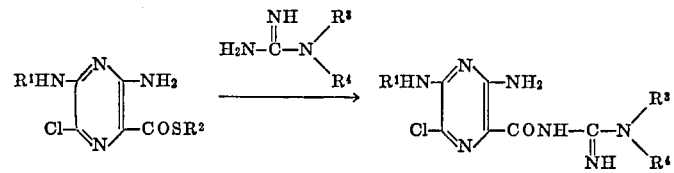

TABLE III

| Ex. | Starting material from Example | R¹ | R² | R³ | R⁴ | M.P. (° C.) end of product |
|---|---|---|---|---|---|---|
| 26 | 4, 15 | H | $C_2H_5-$ | $CH_3-$C₆H₄— | H | 252–254. |
| 27 | 2, 19 | H | C₆H₅— | $CH_3-$ | $CH_3-$ | 277 (HCl.H₂O). |
| 28 | 5, 16 | H | $n-C_3H_7-$ | $-CH_2CH_2OH$ | H | 228.5–229.5(HCl). |
| 29 | 6, 13 | H | C₆H₅—$CH_2-$ | $-CH_2-$C₆H₅ | H | 215–216. |
| 30 | 7, 13 | H | C₆H₅—$(CH_2)_2-$ | $-(CH_2)_2-$C₆H₅ | H | 219–221.5. |
| 31 | 8, 20 | $i-C_3H_7$ | $CH_3-$ | $CH_3-$ | H | >300. |
| 32 | 8, 20 | $i-C_3H_7$ | $CH_3-$ | $CH_3-$ | $CH_3-$ | 238.5–240. |
| 33 | 8, 20 | $i-C_3H_7$ | $CH_3-$ | $-CH_2CH_2OH$ | H | 185–186 (HCl.1/2H₂O). |
| 34 | 8, 20 | $i-C_3H_7$ | $CH_3-$ | $-CH_2-$C₆H₅ | H | 200.5–204.5. |
| 35 | 9, 21 | $-CH_2-CH=CH_2$ | $C_2H_5-$ | H | H | 213–214. |
| 36 | 9, 21 | $-CH_2-CH=CH_2$ | $C_2H_5-$ | $CH_3-$ | $CH_3-$ | 213–215. |
| 37 | 10, 22 | $n-C_4H_9$ | $n-C_3H_7-$ | $CH_3-$ | $CH_3-$ | 187.5. |
| 38 | 11, 23 | cyclopropyl-$CH_2-$ | $n-C_4H_9-$ | H | H | 220–221.5. |
| 39 | 12, 24 | $n-C_4H_9-$ | C₆H₅— | $CH_3-$ | $CH_3-$ | 187.5. |

EXAMPLE 40

3,5-diamino-6-chloropyrazinamidoguanidine hydrochloride

Employing the method of Example 25, but substituting for the guanidine hydrochloride used therein, an equivalent amount of aminoguanidine hydrochloride, there is produced 3,5-diamino-6-chloropyrazinamidoguanidine which after conversion to its hydrochloride salt, has M.P. 277–278° C.

Employing the procedure of Example 40, but substituting for the butyl 3,5-diamino-6-chloropyrazinethiol-carboxylate and the aminoguanidine hydrochloride used therein, equivalent amounts of the $R^2$ esters of 3-amino-5-$NHR^1$-6-chloropyrazinethiolcarboxylate and an aminoguanidine of formula

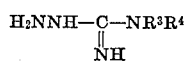

described in Table IV, there are produced the 1-(3-amino-5-NHR-6-chloropyrazinamido)-3-$R^3$-3-$R^4$-guanidine also described in Table IV.

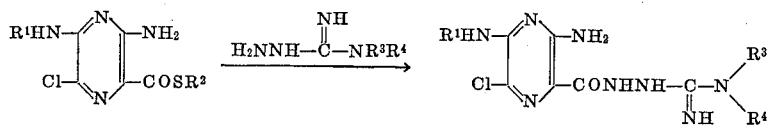

TABLE IV

| Example | Starting material from example | $R^1$ | $R^2$ | $R^3$ | $R^4$ | M.P. (° C.) of end product |
|---|---|---|---|---|---|---|
| 41 | 4, 15 | H | $C_2H_5$— | $CH_3$— | H | 252–253 (HCl). |
| 42 | 2, 19 | H | $C_6H_5$— (phenyl) | $CH_3$— | $CH_3$— | 279–280 (HCl). |
| 43 | 3, 14 | H | $CH_3$— | —$(CH_2)_2OH$ | H | 243–244 (HCl). |
| 44 | 4, 15 | H | $C_2H_5$— | —$CH_2$—(phenyl) | H | 242–245 (HCl). |
| 45 | 5, 16 | H | n-$C_3H_7$— | $(CH_2)_2$—(phenyl) | H | 248–249 (HCl). |
| 46 | 6, 13 | H | (phenyl)—$CH_2$— | $CH_3$— | H | 252–253 (HCl). |
| 47 | 7, 18 | H | (phenyl)—$(CH_2)_2$— | $CH_3$— | $CH_3$— | 279–280 (HCl). |
| 48 | 9, 21 | —$CH_2$—$CH=CH_2$ | $C_2H_5$— | H | H | 182–183 (HCl). |

What is claimed is:

1. A process for the preparation of a compound of structural formula

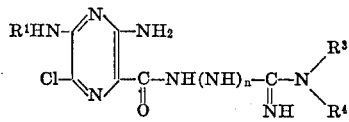

which comprises admixing a compound of structural formula

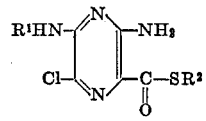

with a compound of structural formula

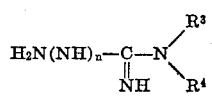

wherein $R^1$ is a member selected from the group consisting of hydrogen, lower alkyl, lower alkenyl, and $C_{3-6}$ cycloalkyl-lower alkyl;

$R^2$ is a member selected from the group consisting of lower alkyl, phenyl, and phenyl-lower alkyl;

$R^3$ is a member selected from the group consisting of hydrogen, lower alkyl, hydroxy-lower alkyl, and phenyl-lower alkyl;

$R^4$ is a member selected from the group consisting of hydrogen, and lower alkyl; and $n$ is an integer selected from 0 and 1.

2. A process as claimed in claim 1 wherein $R^3$ and $R^4$ are hydrogen, and $n$ is 0.

3. A process as claimed in claim 1, wherein $R^3$ and $R^4$ are hydrogen, and $n$ is 1.

4. A process as claimed in claim 1, for the preparation of the compound of formula

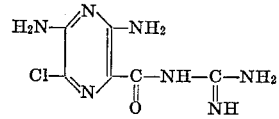

5. A process as claimed in claim 1, for the preparation of the compound of formula $$H_2N-\text{(pyrazine with Cl)}-C(O)-NHNH-C(NH)-NH_2$$

6. A compound of structural formula $$R^1HN-\text{(pyrazine with }NH_2\text{, Cl)}-C(O)-SR^2$$

wherein $R^1$ is selected from the group consisting of hydrogen, lower alkyl, lower alkenyl, and $C_{3-6}$-cycloalkyl-lower alkyl; and $R^2$ is selected from the group consisting of lower alkyl, phenyl, and phenyl-lower alkyl.

7. The compound as claimed in claim 6, wherein $R^1$ is hydrogen.

8. Butyl 3,5-diamino-6-chloropyrazinethiolcarboxylate.

9. Phenyl 3,5 - diamino-6-chloropyrazinethiolcarboxylate.

10. Benzyl 3,5 - diamino-6-chloropyrazinethiolcarboxylate.

References Cited

UNITED STATES PATENTS 3,432,502   3/1969   Pollak et al. _____ 260—250

NICHOLAS S. RIZZO, Primary Examiner

U.S. Cl. X.R.

424—250